United States Patent [19]

Marschall

[11] Patent Number: 4,958,329

[45] Date of Patent: Sep. 18, 1990

[54] HYDROPHONE AND ARRAY THEREOF

[76] Inventor: Richard A. Marschall, 42 Glenwood Dr., Smithtown, N.Y. 11787

[21] Appl. No.: 310,301

[22] Filed: Feb. 13, 1989

[51] Int. Cl.[5] .................................. G01V 1/38

[52] U.S. Cl. .................................. 367/20; 367/154; 367/165

[58] Field of Search .................. 367/20, 154, 15, 106, 367/130, 173, 165, 141; 310/337

[56] References Cited

U.S. PATENT DOCUMENTS 2,551,417 5/1951 Carlisle .............................. 367/154

3,990,035 11/1976 Byers .................................. 367/141

FOREIGN PATENT DOCUMENTS 2220650 3/1973 Fed. Rep. of Germany ...... 367/154

304176 2/1929 United Kingdom ................ 367/130

*Primary Examiner*—Charles T. Jordan

*Assistant Examiner*—J. Woodrow Eldred

*Attorney, Agent, or Firm*—Alexander Norcross

[57] ABSTRACT

A low noise hydrophone which is towed by a cable and has a smoothly increasing front cross-section to a maximum diameter and a smoothly decreasing rear cross-section. The hydrophone sensor is located in the forward section of the hydrophone such that the varying flexural rigidity and shape of the hydrophone results in low turbulence as the hydrophone moves through water.

16 Claims, 1 Drawing Sheet

HYDROPHONE AND ARRAY THEREOF

BACKGROUND OF THE INVENTION

This patent pertains to the field of hydrophones, and especially to arrays of hydrophones for use as towed active sensing devices. Such arrays are used to perform active sound imaging, and depend on a plurality of spaced, active sonic transducers at a controlled spacing for providing data which cannot be obtained readily from a single hydrophone.

U.S. Pat. No. 4,733,379 to Lapetina et al, discloses a form of towed hydrophone array of a type being a uniform diameter linear tube containing individual hydrophone transducers periodically spaced therein. This patent places great emphasis on acoustic cross coupling between each of the transducers. The transducers shown in the preferred drawing are orthogonal to each other, rotated at 90 degree angles.

Massa, U.S. Pat. No. 2,440,903 is an earlier towed array patent again showing a hose type streamer, and specifically claiming the interior, periodic structure of a transverse transducer and window, described internally as being flush with the hose for minimum turbulence. Despite this FIG. 1 discloses a structure No. 21 which is never used in the Art, primarily because any such protuberance would produce excessive noise.

In terms of towed, fish shaped or streamlined sensors, an early patent, U.S. Pat. No. 1,487,138 to Atwood, discloses a single towed elongate structure with tapered ends. At the time of this patent specifically the Art considered that the proper means of reducing the noise due to the rush of water past the towed article (the "fish") was by deployment at either a very low speed or zero forward speed with relative to the water. Despite the introduction of the uniform external cross-section tube, current towed arrays are still severely speed limited because of noise effects.

U.S. Pat. No. 3,842,398 to Massa shows, incident to an invention involving the interconnection of a hydrophone and a towed, expendable velocimeter, a construction for a towed hydrophone array showing a bulbous shaped hydrophone attached to a cable. The hydrophone is described as being embedded in a rigid potting compound, coated with a rubber or rubber-like coating and forming a blended streamline attachment to the outer jacket of the cable.

U.S. Pat. No. 3,990,035 to Byers discloses a hydrodynamically streamlined sonar apparatus. The housing shape is specifically described as being substantially oval in cross section through the length of the object and circular in cross section transverse to the direction of towing. The shape is further restricted to being a Joukowski streamlined shape and the housing is described as being principally rigid solid material. All the transducers of the array are enclosed in but a single housing.

U.S. Pat. No. 3,611,276 to Massa describes one of the velocimeters cited in Donald Massa's above cited U.S. patent. Massa discloses a particular shape for free falling velocimeter having a predictable fixed rate of fall. Further the dropped device is a transmitter; therefore, there is no particular consideration for sensitivity or noise. Massa does describe the dimension of the streamlined probe with respect to the wave length of the sound waves concerned (note Column 4, line 65–75). Massa's shape is intended to achieve a stable free fall rate; turbulence effects are not addressed.

U.S. Pat. No. 4,031,502 to Lefaudeux, et al and U.S. Pat. No. 4,709,361 to Dahlstrom, et al are also of interest for the design of sensor shapes.

SUMMARY OF THE INVENTION

It is known in the field of hydrophones that forming the hydrophones in a teardrop shape reduces turbulence noise around the hydrophones and increases its effectiveness. However, an array of such shapes still produces sufficient turbulence, when towed in series along a cable, that only a uniform diameter cable is considered satisfactory.

The current invention discloses a satisfactory array, constructed first by building each of the towed "fish" from a relatively flexible material, a plastic being the most suitable, having a varying stiffness (flexural rigidity) between the nose and the tail of the individual fish. This fish has significantly reduced background noise interference; broadband noise is especially reduced.

Secondly, the individual hydrophones are constructed of a shape which insures a positive pressure gradient for a significant percentage of the length of the shape. Specifically, the shape, taken in cross section, has continuous second derivatives ( and preferably no points of inflection) for most of its length. Noise producing turbulence occurs at or after a negative pressure gradient in a shape moving through an incompressible fluid. This is not cavitation; non-laminar flow produces sufficient acoustic noise to be a major limiting factor in the effectiveness of a hydrophone.

This shape is combined with an internal construction that places the active sound transducer as far forward in the nose of the shape as possible. The result is a smooth, almost arrowhead shape, with the transducers in the most forward portion, consistent with minimum space requirements. Such a construction has been determined to have significantly reduced noise susceptibility, even when towed a high speeds.

Either or both constructions make feasible a sequential array of hydrophones strung along the cable which is towed behind a ship in water.

It is thus an object of this invention to show a construction of a hydrophone body which makes feasible a low noise towed array of such bodies.

It is a further object of this invention to disclose a construction for an array of hydrophones which is significantly easier to handle on shipboard than a tubular hydrophone array.

It is a further object of this invention to disclose a construction of a hydrophone array which remains effective when towed at higher speeds than heretofore.

DETAILED DESCRIPTION OF THE PREFERRED EMBODIMENT

Figure 1:
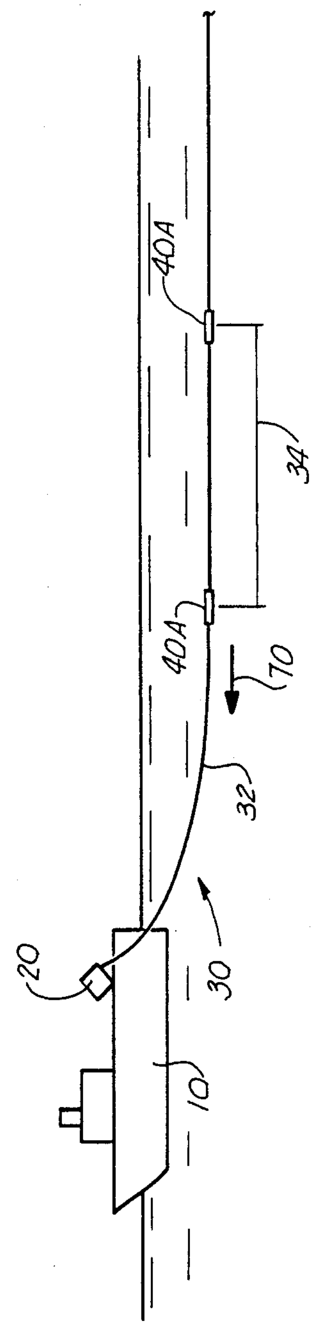
FIG. 1 is an illustrative depiction of a towed array of the invention, not to scale.
Figure 2:
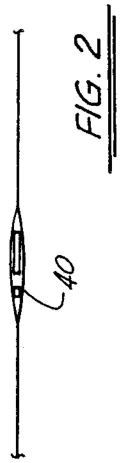
FIG. 2 is a section view of a hydrophone body of the invention.

Applicant here shows as exemplary form of applicant's invention a particular specimen designed for a particular towed hydrophone array.

This example is described in some detail as to its shape and its external configuration for the purposes of conveniently providing a describable example and illustrating the best mode known to the applicant of carrying out his invention. However, as the invention is of a hydrophone shape for containing an acoustic sensor, the form of the acoustic sensor, the supporting electronics, and the electric circuit and cabling are not described, being well understood in the art. It is sufficient, for the purposes of describing this invention, that the towing cable described below both provides a towing force for the hydrophone, spaces the hydrophone, and maintains an electrical and signal connection between individual hydrophones within each hydrophone body and data analysis equipment on board a towing vessel. The choice of an individual acoustic sensor and the method of interconnecting the same for signal purposes is well known, and as it comprises no part of this invention, is not further described here.

Nonetheless, throughout this discussion, it should be understood that the specific shapes and spaces given are not restrictive but rather are examples.

Parsons, et al "The Optimum Shaping of Axisymmetric Bodies for Minimum Drag in Incompressible Flow", J. Hydronautics, Vol. 8 No. 3, July 1974, pp. 100–107 discusses a known series of body shapes generally known as "hydrodynamically smooth"; this is defined as bodies which have a cross sectional geometric section, following a described procedure attributed to Granville, in which the body outline is continuous through the second derivative, without unwanted inflection.

Considerable research exists in regards to the forming of shapes for the reduction of drag in towed vehicles in an incompressible media such as water, in each case seeking to reduce the total force required to tow vehicles either at low or at relatively high speeds, low speeds being in the vicinity of 0–3 or 5 knots, high speeds being at 20 knots or above. Some such research indicates drag may be reduced by reducing boundary layer separation from the shape. Equally, it is recognized that controlled turbulent flow may reduce drag, especially at high Reynolds numbers.

Separately, research has indicated that boundary layer separation may be minimized by providing a coating on the body which provides a distributed damping effect, especially at higher Reynolds Numbers. See for instance, Kramer "Boundary-Layer Stabilization by Distributed Damping", ASME Journal, February 1960, p. 245–233, describing the use of a heavy diaphragm outer coating, damped by an internal liquid dampening for reducing boundary layer separation and turbulent generation in a towed hydrodynamic body.

Separately it has been discovered in incompressible fluid flow (at high Reynolds) Numbers that controlled turbulence onset may be utilized to reduce drag. The common golf ball is a prevalent exemplar of this.

In a towed hydrophone array, of the class of the instant invention, the total drag on the array is a very minor consideration. The principal consideration is the problem of acoustical noise, especially within the frequency range of primary interest to the hydrophones; in seismic hydrophones this is predominantly low acoustical frequencies ranging from 500 down to 17 hertz or lower. Flow separation within an otherwise laminar boundary flow across a hydrophone is therefore to be avoided not because of its drag influence but rather because of the noise generated by the turbulent fluid flow.

Equally important from the point of view of noise reduction or noise minimization is the dynamic towing stability of the hydrophones in the array. It has been shown in the prior art, for instance in prior papers and publications by the inventor here, that hydrophone noise increases significantly with relatively small transverse divergence of the direction of an individual hydrophone to the overall towed direction of the array. This effect is particularly pronounced in the lower acoustical frequencies of interest in for instance, seismic hydrophones.

For this reason, the prior art encases hydrophones in a towed array within a uniform diameter tube producing a towed object which is in essence an infinitely thin, infinitely long cylindrical body of uniform size. Since, however, the diameter of the tube is determined by the maximal cross sectional area at the point where the hydrophones are mounted, the overall unit is relatively fat and heavy with respect to the weight and drag of an optimized array in which individual hydrophone units would be towed. Further, the coupling of the hydrophones acoustically to the water medium is not trivial in the case of such a tube, as is discussed in certain of the prior art patents referenced in this application.

The invention therefore, discloses an array, towed by a substantially thin towing cable, having a defined smoothness and varying thickness, but of a size minimally established by connecting cables and the need for a towing strength. Spaced along the cable are individual hydrophone bodies of the inventive type.

Such a structure would normally be expected by the prior art to produce excessive noise due to turbulent boundary layer separation and/or instability; it would thus be nonfunctional.

Figure 3:
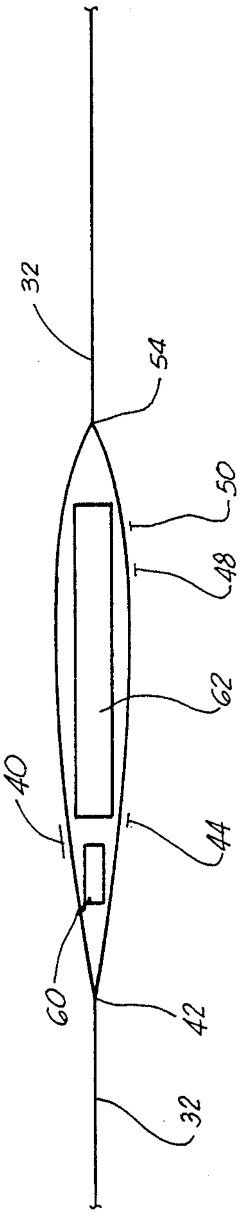
FIG. 3 is a section view of two bodies in an array, to scale.

The inventive hydrophone bodies 40 of the art are more particularly shown by the exemplar model shown in FIG. 3. First, the body 40 is externally hydrodynamically smooth. Ignoring the towing cable 32 which is connected to both the nose 44 and the tail 50 of the body 40, a cross section through the body 40 along a plane parallel to the direction of tow would show a smooth curve rising to a point of maximal cross-sectional diameter 48 from nose 44 to mid-body 48 and then decreasing to the tail 50; the curve preferably would have no points of inflection. At a minimum, mathematically the curve would have continuous second order derivatives.

It should be noted that no points of inflection is an impossible condition to meet at the point 54 at which the body 40 adjoins the tail towing cable(also called a bridle) 32 where a point of a inflection of necessity must occur. The inventive body therefore minimizes the effect of turbulent boundary separation which may occur at this point, especially at high rates of tow, with two design factors.

The first is that the body internally 40 is spaced with the acoustic sensors 60 being located in and coupled through the nose shell section 44, as close as practicable to the point of attachment 42 nose towing bridle. The remaining electronics 62 and associated structure are mounted in the aft two-thirds of the body 40 but substantially forward of the tail section 50. The individual hydrophone bodies themselves are spaced apart on the bridle (cable) 32 at a considerable multiple, in the particular example a distance 34 fourteen times the length 36 of an individual body along the hydrophone towing bridle 32.

As a result, boundary layer separation and thus noise generation is moved to or as far to the rear of the body 40 as is practical. Such noise decays as the fourth power of the radius of separation. Especially under a high speed tow, this minimizes noise pickup by the hydrophone sensing element 60 within a particular body 40 from noise generated by turbulent flow separation in the vicinity of the tail 50 of that body.

Body to body separation distance 34 along the bridle 32, and the uniform thin smoothness of the bridle 32 dampens the effect of flow separation turbulence from a preceding hydrophone body 40*a*, resulting in negligible noise input to a succeeding hydrophone body 40*b* from the turbulence at the preceding body 40*a*, due to distance attenuation and to reintroduction of laminar flow along the towing bridle induced by the geometry described.

Both the onset of turbulence and any tendency towards transverse dynamic instability in the path of the towed bodies is reduced by the invention's second characteristic.

Each of the hydrophone bodies 40 is built of a material having a varying external flexural rigidity extending from nose 44 to tail 50. The nose 44 is preferably the stiffest portion of the body 40. Boundary layer separation is minimized on that portion of the hydrophone body 40 which is expanding in diameter. The tail 50 of the hydrophone body, especially aft of the point 48 of maximum cross sectional area, is of a lesser flexural rigidity.

The inventor has discovered that by creating a body 40 with a varying or differential flexural rigidity from nose to tail that noise, especially that created by transverse excursions from the towing direction 70, is markedly reduced. Preferably the nose is of a relatively rigid plastic, transitioning to a more flexible material towards the tail 50. Preferred flexible materials are relatively high damping such as polyvinyl chloride or a poly-urethane.

In the preferred embodiment here disclosed, the specific sizes and dimensions of both the hydrophone body and the hydrophone body spacing distance 34 are determined by the acoustics of the desired frequency sensitivity of the hydrophone array. Given an assumed constant speed of sound within a fluid media, (for the purposes of this example the speed of sound in saltwater is 1500 meters per second), the array is designed to be spaced so that the spacing 34 between successive hydrophone bodies 40*a*, 40*b* is one-half wave length at the highest frequency of interest.

For example, with a frequency sensitivity having a highest interest frequency of 500 hertz, the array would be spaced with hydrophones at 1.5 meter intervals; a 250 hertz array would have a three meter spacing between hydrophone bodies. A full seismic array would then be built of sections having periodically spaced hydrophone bodies of the described type; a typical array would have as many as 960 such bodies and could extend over two kilometers long.

The specific shape shown has an essentially elongate nose section having a very gradual smooth curve 46 with no points of inflection arising from the towing bridle 42 to a point 48 well aft along the hydrophone's overall length 36 from the particular position of the hydrophone sensor 60. The tail 50 member more steeply curves, but still in a continuous manner, back to the diameter of the towing bridle 32. The shape assures flow is laminar for most of the length of the body by insuring that a positive pressure gradiant exists over most of the body. Any point of boundary layer separation and, therefore, non-laminar flow is well behind the electronics package, well buffered from the active acoustic sensor.

The overall shape is such that the maximum diameter 38 of the hydrophone body 40 is a small multiple of the diameter of the towing cable 32 and is an extremely small fraction of the overall spacing distance 34, hydrophone body 40*a* to hydrophone body 40*b* of the array 30.

Noise from transverse vibrations of the entire hydrophone body, particularly low frequency noise, is minimized by providing a hydrophone body having a reduced flexural rigidity, towards the tail. It should be noted that nose and tail tension on the body is insufficient to maintain the body free of noise producing transverse vibrations.

Noise from flow separation is minimized by utilizing a hydrodynamically smooth body. Separated flow generates broad band noise. Noise from any remaining flow separation is minimized by the combination of the shape which moves any possible point of flow separation well back to the tail of the body and the positioning of the hydrophones into the extreme nose section within the shape.

The invention thus provides a thinner overall, lighter weight long hydrophone array with thicker hydrophone bodies or, alternatively, bodies able to enclose physically larger hydrophones than the uniform tubular towed array of the art, yet with significantly reduced noise from that which would otherwise be expected from the "lumpy" configuration of the array, and which has not been achieved in the prior art.

Further, the relatively thin aspect of the overall array, and the dynamic stability resulting from the varying flexural rigidity of each body permits the array to be towed at considerably higher speeds than arrays of the prior art.

The elimination of the necessity for a uniform sized hydrophone cable casing also significantly reduces both the mass and the stiffness of the overall hydrophone array 30. As disclosed above, a preferred hydrophone array can be in excess of two kilometers in length. The shipboard handling problems imposed by a relatively thick hydrophone cable of the prior art are well known. An array of the inventive construction herein disclosed is both lighter in weight and considerably more flexible in handling than the prior art array thus minimizing wear and strain on shipboard handling equipment 20 and considerably easing the onboard effort necessary to deploy, tow, and retrieve an array of the inventive configuration.

While a preferred configuration has been herein disclosed, it should be apparent that a wider variation of particular shapes is achievable within the general structure herein shown by the inventor. The invention is not therefore restricted to the particular variation shown here for illustrative purposes but rather to that wider range of variations as are inherent in the art.

I claim:

1. A low noise hydrophone of the type towed by a cable comprising:

a hydrodynamically smooth shape, having a nose section further comprising a smoothly increasing cross-sectional diameter from a point of attachment to said towing cable to a point of maximum cross-sectional diameter, having a smoothly decreasing cross-sectional diameter from said point of maximum cross-sectional diameter to a point of attachment to a tail bridle, defining a tail section thereof;

said point of maximal cross-sectional diameter being located substantially closer to said tail bridle attachment than to said point of attachment to said towing cable; and an active hydrophone acoustic sensor within said hydrophone being located substantially forward of said point of maximal cross-sectional diameter.

2. The apparatus as described in claim 1 above, wherein said hydrodynamically smooth shape is circular in cross-sectional diameter.

3. The apparatus as described in claim 1 above, wherein said shape is further defined in that, in lengthwise cross-section it defines a curve that is everywhere continuously second order differential.

4. The apparatus of claim 1 above, further comprising:

said shape being comprised of a material having varying flexural rigidity, being more flexible in the tail section thereof than in the nose section thereof.

5. A linear hydrophone array for sonic imaging in a band of frequencies comprising:

a plurality of sequentially towed underwater hydrophones, each further comprising:

an elongate, tubular nosed bridle section affixed smoothly to:

a hydrophone having a shape, further comprising:

a hydrophone nose section having a smoothly increasing cross sectional diameter from the point of attachment of said hydrophone to said bridle to a point of maximum cross sectional diameter;

a tail section attached to said nose section at said point of maximum cross-sectional diameter, smoothly extending from said point of maximal cross sectional area, in continuously decreasing cross sectional area to a point of attachment to a uniformly elongate tail bridle section;

said nose section being longer than said tail section.

6. The apparatus as described in claim 1 above, where a cross section through said hydrodynamically smooth shape along a plane parallel to said line of direction describes a curve continuously second order differentiable.

7. The apparatus as described in claim 1 above, wherein said tail section is substantially blunter than said nose section.

8. The apparatus as described in claim 2 above, wherein said tail section is substantially blunter than said nose section.

9. The apparatus as described in claim 1 above, wherein said hydrophone further comprises a body of varying flexural rigidity, said nose section being of greater flexural rigidity than said tail section.

10. The apparatus as described in claim 2 above, wherein said hydrophone further comprises a body of varying flexural rigidity, said nose section being of greater flexural rigidity than said tail section.

11. The apparatus as described in claim 3 above, wherein said hydrophone further comprises a body of varying flexural rigidity, said nose section being of greater flexural rigidity than said tail section.

12. The apparatus as described in claim 5 above, wherein the distance between successive said hydrophones is generally equal to one half wave length at the highest frequency of interest.

13. A low noise hydrophone of the type towed by a cable comprising:

a hydrodynamically smooth shape, having a nose section further comprising a smoothly increasing cross-sectional diameter from a point of attachment to said towing cable to a point of maximum cross-sectional diameter, having a smoothly decreasing cross-sectional diameter from said point of maximum cross-sectional diameter to a point of attachment to a tail bridle, defining a tail section thereof;

said point of maximal cross-sectional diameter being located substantially closer to said tail bridle attachment than to said point of attachment to said towing cable; and an active hydrophone acoustic sensor within said hydrophone being located substantially forward of said point of maximal cross-sectional diameter; said shape being comprised of a material having varying flexural rigidity, being more flexible in the tail section thereof than in the nose section thereof.

14. A low noise hydrophone of the type towed by a cable comprising:

a hydrodynamically smooth shape, having a nose section further comprising a smoothly increasing cross-sectional diameter from a point of attachment to said towing cable to a point of maximum cross-sectional diameter, having a smoothly decreasing cross-sectional diameter from said point of maximum cross-sectional diameter to a point of attachment to a tail bridle, defining a tail section thereof;

said point of maximal cross-sectional diameter being located substantially closer to said tail bridle attachment than to said point of attachment to said towing cable;

an active hydrophone acoustic sensor within said hydrophone being located substantially forward of said point of maximal cross-sectional diameter; said hydrophone further comprising a body of varying flexural rigidity, said nose section being of greater flexural rigidity than said tail section.

15. A low noise hydrophone of the type towed by a cable comprising:

a hydrodynamically smooth shape, having a nose section further comprising a smoothly increasing cross-sectional diameter from a point of attachment to said towing cable to a point of maximum cross-sectional diameter, having a smoothly decreasing cross-sectional diameter from said point of maximum cross-sectional diameter to a point of attachment to a tail bridle, defining a tail section thereof;

said point of maximal cross-sectional diameter being located substantially closer to said tail bridle attachment than to said point of attachment to said towing cable;

an active hydrophone acoustic sensor within said hydrophone being located substantially forward of said point of maximal cross-sectional diameter;

said hydrodynamically smooth shape being circular in cross sectional diameter;

said hydrophone further comprising a body of varying flexural rigidity, said nose section being of greater flexural rigidity than said tail section.

16. A low noise hydrophone of the type towed by a cable comprising:

a hydrodynamically smooth shape, having a nose section further comprising a smoothly increasing cross-sectional diameter from a point of attachment to said towing cable to a point of maximum cross-sectional diameter, having a smoothly decreasing cross-sectional diameter from said point of maximum cross-sectional diameter to a point of attachment to a tail bridle, defining a tail section thereof;

said point of maximal cross-sectional diameter being located substantially closer to said tail bridle attachment than to said point of attachment to said towing cable;

an active hydrophone acoustic sensor within said hydrophone being located substantially forward of said point of maximal cross-sectional diameter; said hydrodynamically smooth shape being circular in cross sectional diameter;

said hydrophone further comprising a body of varying flexural rigidity, said nose section being of greater flexural rigidity than said tail section;

said shape being further defined in that, in lengthwise cross section, it defines a curve that is everywhere continuously second order differential.

* * * * *